June 28, 1938. A. J. J. POELMAN ET AL 2,122,111
AIR FILTER
Filed Nov. 22, 1934  2 Sheets-Sheet 2

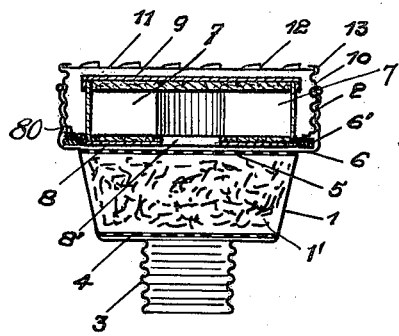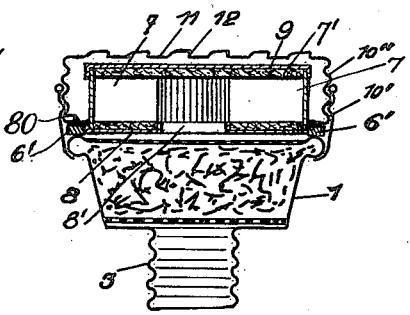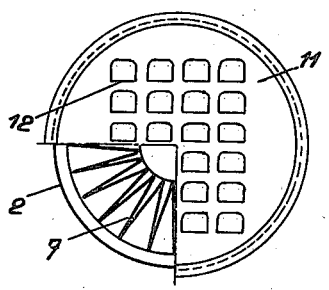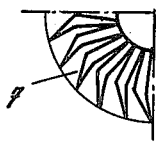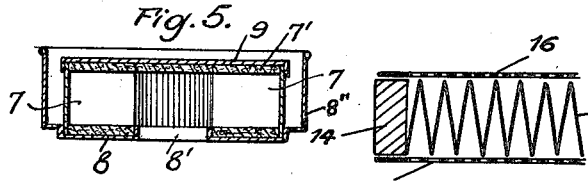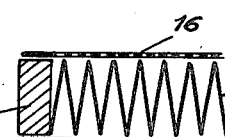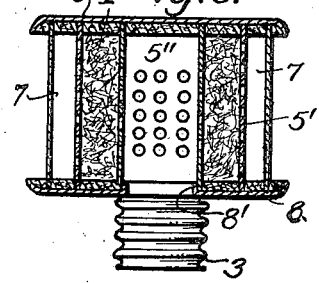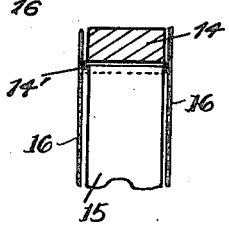

Patented June 28, 1938

2,122,111

UNITED STATES PATENT OFFICE 2,122,111

AIR FILTER

Armand J. J. Poelman, Saint-Maurice, and Robert Schneider, Paris, France

Application November 22, 1934, Serial No. 754,314
In France December 2, 1933

5 Claims. (Cl. 183—49)

The present invention relates to air filters intended to stop dust and liquid vesicles which cannot be stopped by chemical agents nor by adsorbing bodies.

This problem is particularly important for the protection of civilian populations and of military formations, in the case of a "chemical" war, since some noxious products such as arsines are intended to act in the form of an extremely fine and penetrating fog.

It has already been proposed to make use of paper filters for stopping products of that kind.

The object of the present invention is to provide a paper filter having a very large active surface and occupying a space as reduced as possible, this filter being easy to manufacture and affording satisfactory fluid-tightness at the joints.

To this effect, according to our invention we make the filter from a sheet or band of paper which is plaited, preferably parallelly to one of its edges, the joint between the filter mounting and the edges of the plaits being obtained through a luting cement.

Preferred embodiments of our invention will be hereinafter described, with reference to the accompanying drawings, given merely by way of example, and in which:

Fig. 1 is an axial sectional view of an air purifying device including in the same case a filter according to the present invention and an adsorbent system.

Fig. 2 shows how the filter according to the present invention can be adapted to a case of usual shape;

Fig. 3 is a plan view, a portion of the upper wall being cut away;

Fig. 4 is a modification of Fig. 3;

Fig. 5 is an axial section of another embodiment;

Fig. 6 shows the combination of the filter with a physico-chemical purifying device;

Fig. 7 is a sectional view, at right angles to the plaits or folds of the paper, of a plane filter for the protection of a shelter;

Fig. 8 is a section of the same filter in a direction parallel to the plaits of the paper;

Figure 9:
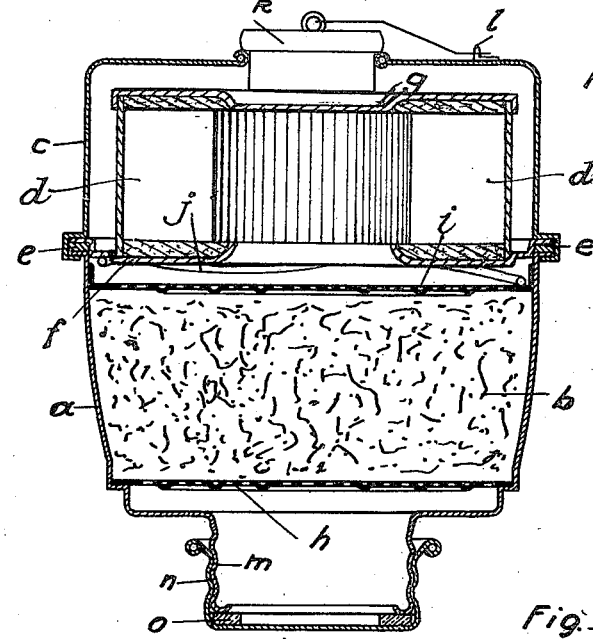
Fig. 9 is an axial section of a modification.

In the embodiment of Fig. 1, the case of the gas mask comprises a frusto-conical weldless portion 1 forming a housing for active carbon 1' for instance. It is prolonged by a cylindrical threaded portion 2 intended to receive the air filter. On its opposite side it is provided with a threaded tube 3 for fixation to the mask proper. The space for active carbon 1' is limited by a perforated end plate 4 inserted with a force fit in portion 1 and by a partition 5, also apertured, welded at several points to the case.

A shoulder 6 provided between parts 1 and 2 forms a seat for a rubber packing ring 6' against which the mounting or frame of the filter is applied.

Said filter consists of a band of paper plaited at right angles to its length and the ends of which have been fixed together by gluing, so as to form an annular element of star-shaped cross section, with radial plaits, as shown at 7 in Fig. 3.

At the edges of the plaits we provide, on one side, a disk 8 with a central aperture 8' and on the other side a solid disk 9. The filter is held between these two disks which constitute its mounting. The outer edges of disks 8 and 9 and the edge of aperture 8' are slightly bent so as to give them the shape of shallow cups. These cups are filled with a luting cement 7' in which the edges of the plaits of the annular paper element 7 are sealed.

The peripheral portion of annular disk 8 forms a flange 80 and rubber ring 6' is adapted to fit between said flange 80 and shoulder 6. Fluid tightness is ensured by the pressure exerted on this peripheral flange 80 by a hollow cylindrical cap 10, which is screwed in the cylindrical portion 2 of the case of the gas mask. The top 11 of this cap is provided with apertures 12 disposed in a lattice-like fashion so as to permit air to penetrate into said cap while protecting the filter against rain. In order to make it possible to turn these apertures in the desired direction, whatever be their position after screwing of cap 10, the top 11 thereof consists of a disk distinct from the threaded cylindrical part of cap 10 and the edges of which are maintained in a groove 13 of said cylindrical part, the disk being able to turn with an easy fit in said groove.

Air enters through these apertures 12, flows around the periphery of the filter, passes through the paper of which said filter is made, dust and vesicles being thus stopped, and then, through orifice 8' this filtered air flows into the body 1 of the case, where carbon adsorbs noxious gases and vapours. The purified air finally enters the mask proper through tube 3.

As paper we preferably choose alfa paper, which is particularly porous. However in order to improve the resistance of the filter, it is advantageous to add from 4 to 5 per cent bisulphite wood pulp to the alfa pulp. Eventually, this paper may undergo, at any step of its manufacture, a treatment for giving its pores the desired fineness, for instance a very light varnishing or an artificial ageing by means of air laden with dust.

The luting cement utilized for fixing the filter to its disks 8 and 9 may consist of any matter capable of forming a fluid-tight joint between the zig-zag edge of the plaited paper element and discs 8 and 9, provided that said matter, sufficiently hard in its normal state, can be caused to assume a sufficiently soft consistency, when assembling the parts of the filter, for permitting of embedding therein the edges of the paper element without deformation thereof. We may for example make use of stabilized rubber latex, containing a self-vulcanizing agent, such, for instance, as Vulka P (piperidyldithiocarbamate of piperidin). We may also make use of polymerized vinyl chloride. However experience has taught that it is particularly advantageous to have recourse to an asphalt having its melting point close to 120° C. and becoming brittle only below −10° C. approximately. This asphalt is poured in the fused state in the shallow cups formed by disks 8 and 9 and the edges of the plaited paper are immersed therein.

In the embodiment of Fig. 2, the filter, which is identical to that above described, rests, through the flange 80 of its annular disk 8, upon a rubber ring 6' bearing upon the rounded edge of case 1. A cover or cap 10" bears, through its lower edge, upon flange 80 against which it is strongly applied by a threaded socket 10' adapted to turn freely with respect to case 1 and screwed on the threaded cylindrical part of said cover 10. As apertures 12 can be turned in the proper direction by rotating cover 10 before finally fixing it, the top, or end plate, 11 of this cover 10 is integral with the cylindrical portion thereof.

In the embodiment of Fig. 5, plate 8 carries a cylindrical peripheral portion 8" the height of which is greater than that of filter 7. When the whole is fixed to the mask, it is this portion 8" that supports the effort exerted by apertured cap 10 or 10".

In the embodiment of Fig. 6, the plaited paper annular element 7 that forms the filter concentrically surrounds the active carbon case, which is located between the disks 8 and 9 of the filter.

The outer wall 5' of the box or case containing active carbon is perforated over its whole surface. On the contrary the inner wall 5" of this box or case is perforated only over the middle portion of its height, in order to avoid that, due to a settling of the carbon in the box, air may flow through said box without being purified by passing through said carbon.

With an outer diameter of 105 millimetres and a height of 70 millimetres, the apparatus contains 200 cubic centimetres of active carbon. The filtering surface of the paper is then 2,250 square centimetres. The apparatus requires only a suction corresponding to 1,2 mm. of water for the passage of 900 litres of air per hour.

In annular shaped filters, the faces of the plaits of the paper band can themselves be undulated or bent, all in the same direction, for instance as shown in Fig. 4.

When it is desired to protect shelters or dugouts, it is possible, as shown in Figs. 7 and 8, to obtain plane filters of very large useful surface by mounting in a frame 14 a plaited sheet of paper 15 between wire-gauzes 16. Parallelly to the plaits the edges of this sheet of paper are fixed to the corresponding elements of the frame, for instance by gluing. The edges of the plaits are, as in the preceding cases, sealed in a luting cement 7', provided in channels 14' carried by the corresponding elements of the frame.

Figure 10:
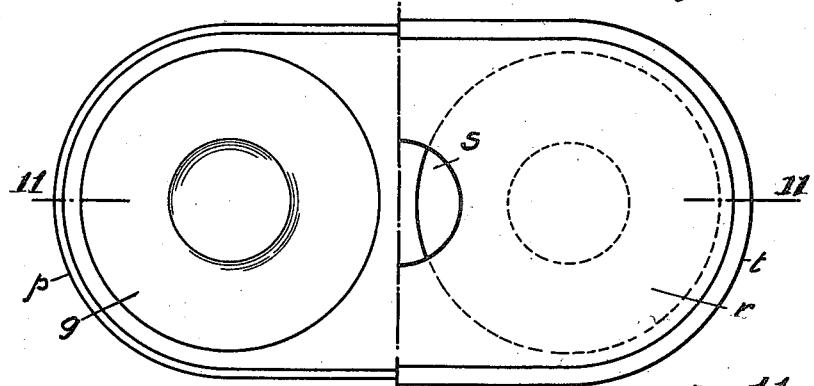
Fig. 10 is a plan view of another modification.
Figure 11:
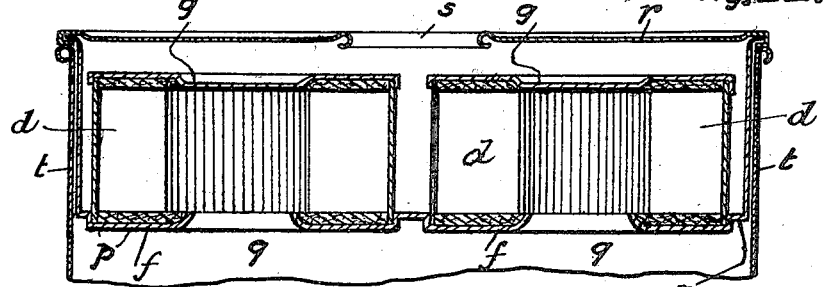
Fig. 11 is a sectional view on the line 11—11 of Fig. 10.

Figs. 9 to 11 inclusive show other embodiments of masks for gases.

According to the embodiment of Fig. 9, the chamber $a$ that contains active carbon $b$ or any other physico-chemical purifying agent which is made rigid with the chamber $c$ containing the annular filter $d$ made of plaited paper.

The lower edge of this chamber $c$ is set under the bent edge of chamber $a$, a packing annular member being interposed therebetween for fluid-tightness. Against this annular member is applied the edge of the partition $f$ that separates chamber $a$ from chamber $c$. This partition is provided with an annular shallow recess adapted to contain the luting cement in which is fixed one of the edges of paper filter $d$. The other edge of this filter is also luted in an annular shallow recess provided in solid disc $g$.

The active carbon $b$ is maintained between a perforated disc $h$ the periphery of which rests against an inner shoulder of chamber $a$, and another perforated disc $i$ subjected to the action of a spring $j$ interposed between disc $i$ and partition $f$. The carbon present in said chamber is thus constantly compressed so as to avoid the formation of hollow spaces therein, which would permit air to escape the action of the physico-chemical purifying body. Discs $h$ and $i$ are provided with annular ribs intended to improve their rigidity.

When the device is not in use, the air inlet hole is stopped by means of a rubber plug $k$ fixed to an arm $l$. In a like manner, the conduit $m$ for connecting the device to the mask proper is closed by means of a screw threaded cap $n$, with a packing annular member $o$.

In the embodiment of Figs. 10 and 11, two annular filters $d$, made of plaited paper, are luted in corresponding shallow grooves provided in the bottom of a box-like structure $p$, around holes $q$ for the passage of air. The other edge of filters $d$ is luted in annular shallow grooves of solid discs $g$. Boxlike structure $p$ is provided with a cover $r$ fixed thereto and provided with a central air inlet hole $s$. The whole is adapted to fit on the opening of a flask $t$ which contains the physico-chemical purifying body.

While we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. In combination with a mask including a case for the passage of air, and an air permeable partition of an adsorbent material disposed in said case across the path of travel of said air, a filter including a band of paper plaited across its width and the ends of which are glued together so as to form a ring-shaped plaited element, two parallel rigid discs, luting cement fixing the zig-zag edges of said annular plaited element to said discs respectively, one of said discs being solid and the other being provided with at least one opening in the circular portion thereof surrounded by said annular element, and means for fixing said filter to said case in such manner that the second mentioned disc is applied in a fluid-tight manner against said case with its opening opposite said partition.

2. In combination with a mask including an annular case for the passage of air, and an air permeable partition of an adsorbent material disposed in said case across the path of travel of said air, a filter including a band of paper plaited across its width and the ends of which are glued together so as to form a ring-shaped element, two parallel rigid discs, luting cement fixing the zig-zag edges of said annular plaited element to said discs respectively, one of said discs being solid and the other being provided with at least one opening in the circular portion thereof surrounded by said annular element, a casing surrounding said filter, and means for rigidly assembling together in a fluid-tight manner the ends of said case and said casing and the outer periphery of the second mentioned disc in such manner that the opening thereof is located adjacent said partition.

3. In combination with a mask including an annular case for the passage of air, and an air permeable partition of an adsorbent material disposed in said case across the path of travel of said air, a filter including a band of paper plaited across its width and the ends of which are glued together so as to form a ring-shaped element, two parallel rigid discs, luting cement fixing the zig-zag edges of said annular plaited element to said discs respectively, one of said discs being solid and the other being provided with at least one opening in the circular portion thereof surrounded by said annular element, an annular casing surrounding said filter having one edge rigidly fixed to the corresponding edge of said case and to the outer periphery of the second mentioned disc in such manner that the opening of said second mentioned disc is located adjacent said partition, and a packing member interposed between said periphery of the second mentioned disc and the edge of at least one of said case and casing elements.

4. In combination with a purifying device having an inlet and an outlet, and a partition of an adsorbent material interposed between said inlet and said outlet, a filter including a band of paper plaited across its width and the ends of which are glued together so as to form a ring-shaped plaited element, two parallel rigid discs, luting cement fixing the zig-zag edges of said annular plaited element to said discs respectively, one of said discs being solid and the other being provided with at least one opening in the central portion thereof surrounded by said ring-shaped element, and means for fixing in a fluid-tight manner said second mentioned disc upon the inlet of said purifying device.

5. In combination with a purifying device including a cylindrical case with an inlet and an outlet and a partition of an adsorbent material interposed between said inlet and said outlet, a filter including a band of paper plaited across its width and the ends of which are glued together so as to form a ring-shaped plaited element, two parallel rigid discs, luting cement fixing the zig-zag edges of said annular plaited element to said discs respectively, one of said discs being solid and the other being provided with at least one opening in the central portion thereof surrounded by said ring-shaped element, and means for fixing in a fluid-tight manner said second mentioned disc upon the inlet end of said cylindrical case.

ARMAND J. J. POELMAN.
ROBERT SCHNEIDER.